United States Patent
Hoey et al.

(10) Patent No.: US 8,196,193 B2
(45) Date of Patent: Jun. 5, 2012

(54) METHOD FOR RETROFITTING PASSWORD ENABLED COMPUTER SOFTWARE WITH A REDIRECTION USER AUTHENTICATION METHOD

(75) Inventors: Thomas J. Hoey, Amherst, NH (US); Gregg Browinski, Amherst, NH (US)

(73) Assignee: PistolStar, Inc., Amherst, NH (US)

( * ) Notice: Subject to any disclaimer, the term of this patent is extended or adjusted under 35 U.S.C. 154(b) by 836 days.

(21) Appl. No.: 12/175,921

(22) Filed: Jul. 18, 2008

(65) Prior Publication Data

US 2009/0150989 A1  Jun. 11, 2009

Related U.S. Application Data

(60) Provisional application No. 61/012,167, filed on Dec. 7, 2007, provisional application No. 61/012,086, filed on Dec. 7, 2007.

(51) Int. Cl.
*G06F 7/04* (2006.01)

(52) U.S. Cl. ........... 726/10; 726/2; 726/3; 726/4; 726/5; 726/6; 726/8; 726/9; 713/155; 713/156; 713/182; 713/183; 713/184; 713/185; 713/186; 713/189; 713/169; 713/193; 380/281; 380/279; 709/226; 709/229; 455/111

(58) Field of Classification Search ............ 726/10
See application file for complete search history.

(56) References Cited

U.S. PATENT DOCUMENTS

| | | | |
|---|---|---|---|
| 5,241,594 A | 8/1993 | Kung | |
| 5,684,950 A | 11/1997 | Dare et al. | |
| 5,944,824 A | 8/1999 | He | |
| 6,006,333 A | 12/1999 | Nielsen | |
| 6,178,511 B1 | 1/2001 | Cohen et al. | |
| 6,243,816 B1 | 6/2001 | Fang et al. | |
| 6,668,323 B1 | 12/2003 | Challener et al. | |
| 7,055,032 B2 | 5/2006 | Sandhu et al. | |
| 7,246,230 B2 | 7/2007 | Stanko | |
| 7,272,231 B2 | 9/2007 | Jonas et al. | |

(Continued)

FOREIGN PATENT DOCUMENTS

KR    2002085734    11/2002

(Continued)

OTHER PUBLICATIONS

Kelvin Lawrence and Chris Kaler,"Web Services Security UsernameToken Profile 1.1", OASIS Standard Specification, Feb. 1, 2006, pp. 1-19.*

(Continued)

*Primary Examiner* — Edan Orgad
*Assistant Examiner* — Canh Le
(74) *Attorney, Agent, or Firm* — Bourque and Associates, PA

(57) ABSTRACT

A device, method, and system disclosed herein may be used to integrate and control authentication and passwords among various applications and platforms. The exemplary method may obtain a service ticket from a key distribution center of the key distribution center authentication process and generate a random key. A port between the client and the service may be created and utilized to transmit the service ticket and the random key to a service from the client. The random key may replace a password provided by the user. The random key in the password field of the service logon is transmitted to the service. The service authenticates the random key in the password field with the stored random key in the cache of the service. Once authenticated the service ticket is validated.

8 Claims, 2 Drawing Sheets

U.S. PATENT DOCUMENTS

| | | | |
|---|---|---|---|
| 7,313,816 | B2 | 12/2007 | Sinha et al. |
| 2002/0002678 | A1 | 1/2002 | Chow et al. |
| 2002/0111942 | A1* | 8/2002 | Campbell et al. .................. 707/3 |
| 2002/0150253 | A1* | 10/2002 | Brezak et al. ................. 380/281 |
| 2003/0188193 | A1* | 10/2003 | Venkataramappa .......... 713/201 |
| 2003/0217288 | A1 | 11/2003 | Guo et al. |
| 2003/0226036 | A1 | 12/2003 | Bivens et al. |
| 2004/0025026 | A1 | 2/2004 | Karp et al. |
| 2005/0108521 | A1 | 5/2005 | Silhavy et al. |
| 2005/0138399 | A1 | 6/2005 | Cheston et al. |
| 2005/0144463 | A1 | 6/2005 | Rossebo et al. |
| 2006/0085845 | A1 | 4/2006 | Davis et al. |
| 2006/0107064 | A1 | 5/2006 | Fiske |
| 2006/0206926 | A1 | 9/2006 | Luo et al. |
| 2006/0224891 | A1* | 10/2006 | Ilac et al. ....................... 713/171 |
| 2006/0230438 | A1* | 10/2006 | Shappir et al. .................... 726/8 |
| 2006/0236382 | A1 | 10/2006 | Hinton et al. |
| 2006/0288230 | A1* | 12/2006 | Crall et al. ..................... 713/183 |
| 2007/0006291 | A1 | 1/2007 | Barari et al. |
| 2007/0061561 | A1 | 3/2007 | Hashiguchi |
| 2007/0107049 | A1 | 5/2007 | Guo |
| 2007/0157032 | A1 | 7/2007 | Paganetti et al. |
| 2007/0186115 | A1 | 8/2007 | Gao et al. |
| 2007/0245150 | A1 | 10/2007 | Lu et al. |
| 2007/0255943 | A1 | 11/2007 | Kern et al. |
| 2007/0283161 | A1 | 12/2007 | Yami |
| 2007/0300077 | A1 | 12/2007 | Mani et al. |
| 2008/0005577 | A1 | 1/2008 | Rager et al. |
| 2008/0028447 | A1* | 1/2008 | O'Malley et al. ................. 726/6 |
| 2008/0072303 | A1* | 3/2008 | Syed .............................. 726/10 |
| 2009/0110200 | A1* | 4/2009 | Srinivas ....................... 380/279 |

FOREIGN PATENT DOCUMENTS

| | | |
|---|---|---|
| KR | 2003033630 | 5/2003 |

OTHER PUBLICATIONS

Jan De Clercq, "Kerberos Authentication Problems Occur When Users Belong to Many Groups", Dec. 1, 2004, pp. 1-3.*

The NT Local Administrator and Shared Passwords, Daniel Marvin, Apr. 2, 2001, http://www.securityfocus.com/print/infocus/1353.

Leverage Active Directory with Kerberos to Eliminate HTTP Password SSO to Domino, Sametime, and QuickPlace, White Paper, PistolStar, Inc., Amherst, NH, 2007.

Single sign-on for SAP with Tivoli Access Manager and Microsoft Windows, Peter Tuton, Aug. 17, 2006, IBM website.

PistolStar Intros Password Power Plug-In for Lotus Sametime Single Sign-On via Kerberos, Nov. 15, 2007, TMCnet News (Wireless News Via Thomson Dialog NewsEdge).

PistolStar Enables Lotus Sametime Single Sign-On Via Kerberos, Nov. 6, 2007, Netnewsletter, Journal, Market Wire.

* cited by examiner

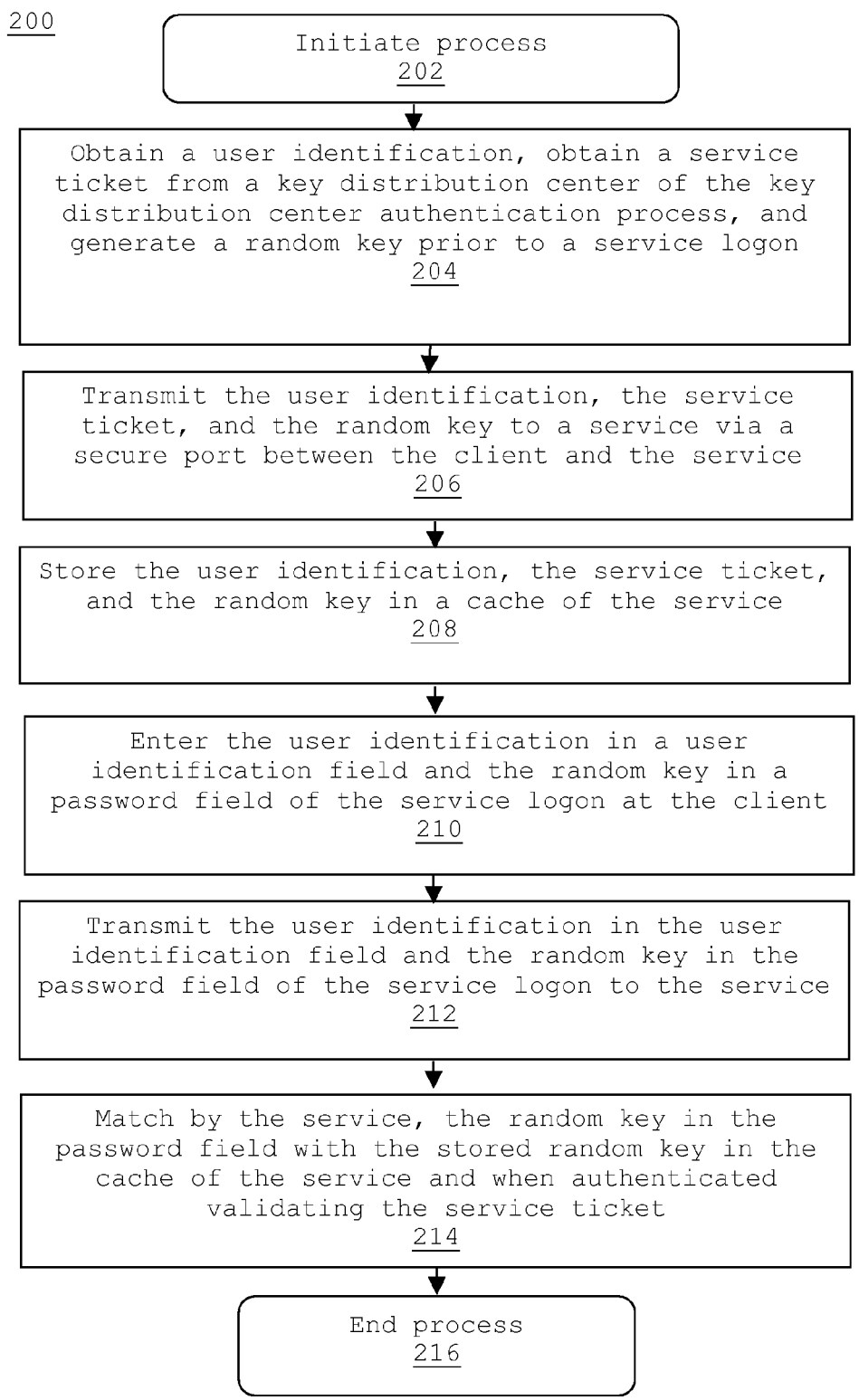

METHOD FOR RETROFITTING PASSWORD ENABLED COMPUTER SOFTWARE WITH A REDIRECTION USER AUTHENTICATION METHOD

CROSS-REFERENCE TO RELATED APPLICATIONS

This application claims priority to U.S. Patent Application No. 61/012,167 filed Dec. 7, 2007, entitled Password Generation, and U.S. Patent Application No. 61/012,086 filed Dec. 7, 2007, entitled Single Sign-On, which are incorporated fully herein by reference.

TECHNICAL FIELD

The present invention relates to user authentication and more particularly, relates to pre-authentication integration.

BACKGROUND INFORMATION

In complex computing environments, passwords are often the source of frustration, wasted time and unnecessary expense. Users regularly access about eight to ten different systems. This frustrates users by requiring them to remember too many passwords, having multiple password prompts and the chore of resetting their passwords when they forget them. For example, employees in companies using IBM Lotus applications typically have numerous password prompts. Passwords are needed to access Microsoft Windows® as well as Domino HTTP sessions such as Lotus Domino® Web Access ("iNotes®"), Sametime®, QuickPlace®, and Domino Web applications. Users are often so afraid they will not be able to get back in or utilize a service in the future, they leave the figurative key in the door, with weak passwords like "password" or sticky notes posted all over their cubicles. With the increase in remote access and demand for greater resource access by members, security issues are becoming a greater concern and bigger challenge. Dictionary attacks, hacking and other vulnerabilities caused by poor password quality are putting sensitive information and/or resources at risk.

Frequently, companies implement an authentication solution that provides a secure and comprehensive security solution. One such solution is a Kerberos network authentication protocol. Kerberos is a network authentication system that has been publicly available since introduced by the Massachusetts Institute of Technology (MIT) in 1989. Kerberos has become a popular authentication mechanism in Microsoft Windows® and Active Directory, making it widely employed in the operating system market utilizing the operating system Microsoft Windows®. Because of its openness, Kerberos can be utilized to create single sign-on network environments, allowing end-users to employ one set of credentials to access all services, regardless of platform or operating system.

However, many services or applications may still require their own independent security measures, which may still require the user to provide identification and password independent of the platform or operating system. This may still result in multiple passwords and user identification maintenance, which again may lead to frustration, wasted time and unnecessary expense. Many of these services or applications may include an architecture specific to the security measures of the service or application, which prevent integration or compromise the effectiveness of another authentication solution.

SUMMARY

The present invention is a novel device, system, and method for key distribution center authentication integration. The exemplary method may identify a user, obtain a service ticket from a key distribution center of the key distribution center authentication process, and generate a random key by the client prior to authenticating with the service. A secure port between the client and the service may be produced to transmit the user identification, the service ticket, and the random key to a service from the client. The transmitted user identification, the service ticket, and the random key may be stored in a cache of the service. The user identification may be entered into a user identification field and the random key may be entered into a password field of the service logon at the client. The random key may replace a password provided by the user or may be hidden to the user and occur without any prompt to the user. The user identification in the user identification field and the random key in the password field of the service logon are transmitted to the service. The service matches the random key in the password field with the stored random key in the cache of the service. Once matched the associated service ticket from the cache is validated.

Embodiments of the invention may have one or more of the following advantages. Embodiments of the invention may generate a random key for each logon and each user. Embodiments may identify the user, obtain the service ticket from the key distribution center, and generate a random key at various stages of service initiation or logon. The invention may be utilized with a Kerberos or other Public Key Infrastructure (PKI) and may be in combination with a service utilizing a clear-text password. Embodiments of the invention may additionally map the user identification of the service ticket with a user identification in a user directory of the service.

The present invention is not intended to be limited to a system or method that must satisfy one or more of any stated objects or features of the invention. It is also important to note that the present invention is not limited to the exemplary or primary embodiments described herein. Modifications and substitutions by one of ordinary skill in the art are considered to be within the scope of the present invention, which is not to be limited except by the following claims.

BRIEF DESCRIPTION OF THE DRAWINGS

These and other features and advantages of the present invention will be better understood by reading the following detailed description, taken together with the drawings wherein:

FIG. 2 is a flow chart illustrating an exemplary embodiment pre-authentication integration processing according to the invention.

DETAILED DESCRIPTION

Figure 1:
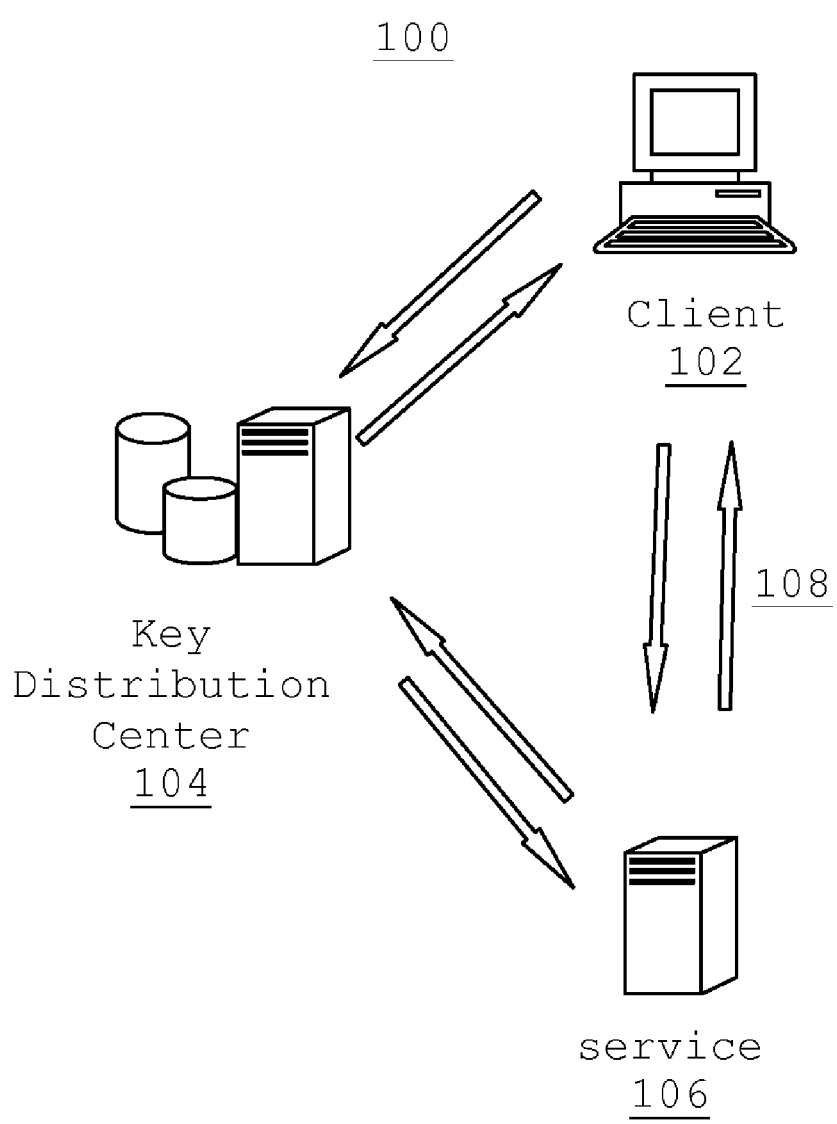
FIG. 1 is an exemplary network diagram demonstrating the interaction of components according to the present invention.

An authentication integration method may be used to integrate and control authentication and passwords among various applications and platforms of a service. The authentication integration method may extend a service's existing authentication framework to utilize a single sign-on authentication platform in a secure fashion. The authentication integration may be carried out pre-validation and/or pre-issuance of keys by certifying authority or trusted third party of a public key infrastructure (PKI). One such exemplary certificate authority authentication is the Kerberos network authentication protocol.

Referring to FIG. 1, Kerberos utilizes a centralized authentication server(s) referred to as a Key Distribution Center (KDC) 104. The KDC 104 is the trusted third-party through which all authentication requests are routed. Kerberos may require direct connectivity to the KDC 104, as the KDC may contain the database of user identifications and passwords for both clients and the Kerberos-enabled services. In Microsoft Windows®, the KDC 104 is a Microsoft Active Directory domain controller. A client 102 first authenticates to the KDC 104 using an Active Directory domain account.

If successful, they receive a Ticket Granting Ticket (TGT), which is cached by the local security subsystem of the client's workstation for a time period of, for example, 8-24 hours. The TGT is used to prove the client's identity to the KDC 104 when the client 102 requests authentication to other services or resources 106, for example, Domino HTTP. The KDC 104 validates the client's TGT, ensures the requested service exists within its directory, and then encrypts the client's information and a session key in a service ticket. The client's browser may automatically transmit this service ticket to the service 106, but the client cannot actually decrypt the service ticket. Only the service 106 and the KDC 104 can decrypt the service ticket to get the client's information and the session key. The service 106 trusts the credentials in the service ticket because the service 106 knows the ticket could only be created by the KDC 104 and thus recognizes the client 102 must have been authenticated by the KDC 104 in order to receive the ticket. The service ticket has a limited lifetime and the receiving service 106 can store used tickets, thus preventing replay attacks. It should be understood that a service 106 may be a variety of resources, for example, a server, an application, another user or other resource accessed by a user.

Some services 106 with authentication architecture specific to that service 106 may prevent the integration of a key distribution system. Due to a limit in container sizes of the specific authentication architecture, the key distribution system may not be able to piggyback onto the service's authentication architecture. Generally, the service's authentication architecture may prompt the user for a user identification and a password. The user may enter or utilize script to automatically enter the user identification and/or a password into fields provided by the service at the client 102. In some services the containers may be designed to hold user identification and passwords directly entered by the user. These containers may be designed with relative limited size. Since the containers are designed to hold a character string memorized by a human and not a larger string designed for security purposes they may be of limited size relative to the size of service tickets or keys. The size of the containers may prevent their use to hold a service ticket granted by the KDC 104. An exemplary authentication integration system 100 may still leverage these containers by generating a random key designed to fit within the container of the service's specific authentication architecture.

Prior to utilizing the containers, the exemplary authentication integration system 100 may establish a secondary channel or portal 108 between the client 102 and the service 106. The client 102 transmits the user identification, a service ticket associated with the certifying authority, and the random key to the service 106 prior to the user logging on or accessing the service 106 through the default/standard client application. The portal 108 may be a secure portal produced by script on both ends of the communication channel. The secure portal may prevent usurping the overall security of the system by preventing the eavesdropping or snooping during transmission for the user identification, the service ticket, the random key or other vital information. Once received, the service 106 temporally stores the user identification, the service ticket, and the random key in a cache or other temporary storage.

When the user attempts to logon or access the service 106, the authentication architecture specific to the service 106 may prompt the user for a user identification and a password as previously discussed. Script at the client 102 places the generated random key into the container of the user identification or password. The containers are then transmitted to the service 106. The service 106 matches the random key in the container with the random key sent via the portal 108 and currently stored in the cache. If the random key is matched, the service 106 accesses the service ticket stored and associated with the random key. The service 106 then uses the service ticket as if it had been validly sent to the service 106.

Referring to FIG. 2, an exemplary method for authentication integration according to the invention may be utilized by an authentication system. The process may be initiated by an event occurring prior to the logging on or access of a service (block 202). This event may be triggered by, for example but not limited to, the startup of the application or operating system of the client 100. Script on the client side may be used to initiate the process and produce and gather user information (block 204). The client side script may access the user identification in Active Directory. The script may use the user identification and other information to obtain a service ticket from the KDC 104 of the key distribution center authentication process. The script may also generate a random key. The random key may be generated at the client and designed specifically for the service based on the user identification or password containers as previously discussed. The random key may be generated for each session and/or for each user. The random key may be base64 encoded and sent via multiple packets over a network. The random key may be designed to only fit within the password container or other embodiment designed to be fit in the user identification container or other container and/or combination of containers used by the service's 106 authentication process.

The script may also work in conjunction with script executed on the service side to provide a portal between the client 102 and service 106. The script may utilize an Eclipse framework. In another exemplary embodiment, the service 106 may create a listener socket on a configurable port at startup of the service 106. The script on the service side may produce a thread designed to listen for the transmission of information from the client 102. The script on both sides of the transmission may follow predetermined security protocol to authenticate and provide secure communications between the client 102 and service 106. The client 102 transmits the user identification, the service ticket, and the random key to the service 106 (block 206).

When the service 106 receives the user identification, the service ticket, and the random key; the information may be stored in a cache of the service 106 (block 208). The script may also produce and manage a single, global hash map data structure in which to store the service ticket. The hash map may allow for very fast lookups based on a unique key value. The hash map can contain multiple tickets for a single user and may only be saved in memory. By preventing storage to a hard drive access to the information may be limited. Once a ticket is used during a session, its associated object may be immediately purged from the hash map. If the server is shutdown, all entries in the hash map may be automatically destroyed.

Script executed on the service 106 may utilize an application programming interface (API) of the service 106 to override authentication of the service 106. The method may use or validate the credentials, for example, user identification and password, as desired. The script may be used to override the service's 106 authentication process and accept authentication by the script and ignore the authentication processes of the service 106. In an example using Kerberos and Sametime server, the user identification field may default to the last value input by the user since it's ignored by the Kerberos process the user identification field may be left unmodified. The Password field may be populated with the random key value as previously discussed. In various embodiments, the script may override features of the service's authentication or may work in conjunction with features of the service's authentication.

The authentication process of the service 106 may be recognized, transparent, or a hybrid to the user. For example, the user may not even be aware that the user is logging into a service 106 when the user accesses the service 106. In the example provided, the user may be prompted by the service 106 to enter a user identification and password. The user may enter both items but be unaware that the entered password is replaced by the generated random password and the generated random password is actually used to log into the service 106.

The script may override the authentication processes of application of the service 106 by, for example, the "UI Branding" extension point that allows for application to display their own corporate graphic or logo on the logon dialog. By registering for this extension, the script may effectively inject code into the code of the application. Through window hierarchy ("child" and "parent" structures), the script is able to obtain a reference to the top level window of the logon dialog. With the Eclipse framework the script may be able to register for the event that fires when the logon dialog is activated/created. By listening for this event, the script may delay the window from appearing/displaying while it attempts the SSO process and even completely prevent it from appearing by drilling down into the window hierarchy to find handles/references to the user identification and password fields, populating them automatically and simulating the user pressing the Logon button (which would normally close the logon dialog). This may be done using standard Eclipse API calls ((block 210).

The user identification and password containers are transmitted from the client 102 to the service 106 (block 212). This may be accomplished using the authentication architecture of the service 106. The authentication architecture may use encrypted packets to transmit the containers. When the service 106 receives the packets, the script on the service side may match the random key in the password field with the stored random key in the cache of the service (block 214). If invalid the service 106 may deny access to the service 106 by the client 102. If matched, the service 106 may validate the service ticket. The service 106 may utilize the user identification as the fully authenticated identity to the service or map it to some other application-specific name. The client may now access resources of the service 106 and make use of the service ticket authentication process. Script on the service side may limit duration of the random key. The process may be completed once the random key is authenticated or after expiration of the random key or service ticket (block 216).

Since the random key may be specific for each user and/or each session, the ability to determine the random key by third party may be limited or even prevented. The random key may be tied to the duration of the service ticket. Therefore, the random key may be valid only for the period of time the service ticket is valid. The duration of the random key may be tied to the complexity of the key. For example, a smaller password container may utilize shorter session duration to limit the ability of the random key being compromised.

The components of the exemplary embodiments may use libraries, executable files and plug-ins to carry out the embodiments of the invention. The exemplary computer system 100 provides a block diagram for demonstrating action and components of the system. Although the exemplary block diagram utilizes a computer system 100, it is understood that various components and actions may be substituted, combined, or performed externally.

As should be understood by the previous examples provided in FIGS. 1 and 2, the exemplary embodiments may be implemented in a variety of computer software, firmware, hardware, digital electronic circuitry, or in combinations of them. The exemplary embodiments described herein can be implemented as a computer program product, i.e., a computer program tangibly embodied in an information carrier, e.g., in a machine-readable storage device or in a propagated signal, for execution by, or to control the operation of, a communications processing apparatus, e.g., a processing device, a computer, or multiple computers. A computer program can be written in any form of programming language, including compiled, assembled, or interpreted languages, and it can be deployed in any form, including as a stand-alone program or as a module, component, subroutine, library, or other unit suitable for use in a computing environment. A computer program can be deployed to be executed on one computer or on multiple computers at one site or distributed across multiple sites and interconnected by a communication network.

Modifications and substitutions by one of ordinary skill in the art are considered to be within the scope of the present invention, which is not to be limited except by the following claims.

The invention claimed is:

1. A method of retrofitting an existing, password enabled client-server based computer software application desired to be run by a user, with a redirected authentication method to allow it to leverage newer authentication methods it does not otherwise support, said method comprising the acts of:

providing a client-side authentication redirection plug-in to an existing client side computer software application component, said client-side authentication redirection plug-in consisting of machine-readable computer instructions;

providing a server-side authentication redirection plug-in to an existing server-side computer software application component, said server-side authentication redirection plug-in consisting of machine-readable computer instructions;

generating, by a user on a user computer device, a request to access said existing, password enabled, client-server based computer software application, said request directed to said existing client-server based computer software application desired to be run by a user, said request having an associated user name;

intercepting, by said client-side authentication redirection plug-in, said user generated request to access said existing password enabled, client-server based computer software intended for said computer software application desired to be run by a user;

redirecting, to a user identification service and by said client-side authentication redirection plug-in, said request to access said existing password based computer software application;

responsive to said redirected request, said user identification service establishing two-way communication with said user computer device in order to verify user identity;

responsive to said user identification service establishing two-way communication with said user computer device, said user identification service generating a user specific user authenticator and forwarding said user specific user authenticator to said client-side authentication redirection plug-in;

responsive to receipt of said user specific user authenticator by said client-side authentication redirection plug-in, said client-side authentication redirection plug-in generating a user specific associated random identifier, and forwarding said user specific user authenticator and said user specific associated random identifier to said server-side authentication redirection plug-in on a server device;

responsive to receipt of said user specific user authenticator and said user specific associated random identifier by said server-side authentication redirection plug-in on said server device, said server device storing said user specific user authenticator and said user specific associated random identifier;

forwarding, by said client-side authentication redirection plug-in to said existing server-side computer software application component over a user name and password communication path, said user name and said user specific associated random identifier;

sending, by said server-side authentication redirection plug-in on said server device, an indication of said successful receipt of said user name and said user specific associated random identifier to said client-side authentication redirection plug-in;

responsive to receipt of said user name and user specific associated random identifier, said server-side authentication redirection plug-in first verifying said user authentication by comparing said user specific associated random identifier with one or more user specific associated random identifiers stored on said server device to insure that said user specific associated random identifier is associated with the user specific user authenticator, and secondly verifying that said user specific user authenticator provided by said user identification service is associated with the user name forwarded by said client-side authentication redirection plug-in to said existing server-side computer software application component over said user name and password communication path;

responsive to said verified user authentication and said verification that said user specific user authenticator provided by said user identification service is associated with the user name forwarded by said client-side authentication redirection plug-in successful verifications, said server-side authentication redirection plug-in overriding authentication decision of said existing server-side computer software application component; and responsive to receipt of authentication override by said existing server-side software application component, allowing access by said authenticated user to said existing software application.

2. The method of claim 1, further comprising the action of:
preventing, by said client-side authentication redirection plug-in, a display of a prompt to the user regarding entering the user name and a password for access to the client-server based computer software application.

3. The method of claim 1, wherein said request to access said existing, password-enabled, client-server based computer software application generated by said user on said user computer device includes a user name.

4. The method of claim 3, wherein said user name is provided from a previous user sign on to said user computer device.

5. The method of claim 1, wherein said act of said user identification service establishing two-way communication with said user computer device in order to verify user identity includes obtaining a user name from said user on said user computer device.

6. The method of claim 1, wherein said user specific identifier is valid for a predetermined period of time.

7. The method of claim 1, wherein the user identification service includes Kerberos.

8. The method of claim 7, wherein the wherein the user specific user authenticator is a Kerberos session ticket.

* * * * *